March 1, 1938. V. W. KLIESRATH 2,110,021
DRIVING MECHANISM
Filed Jan. 21, 1933 5 Sheets-Sheet 1

INVENTOR.
VICTOR W. KLIESRATH
BY
ATTORNEY.

INVENTOR.
VICTOR W. KLIESRATH

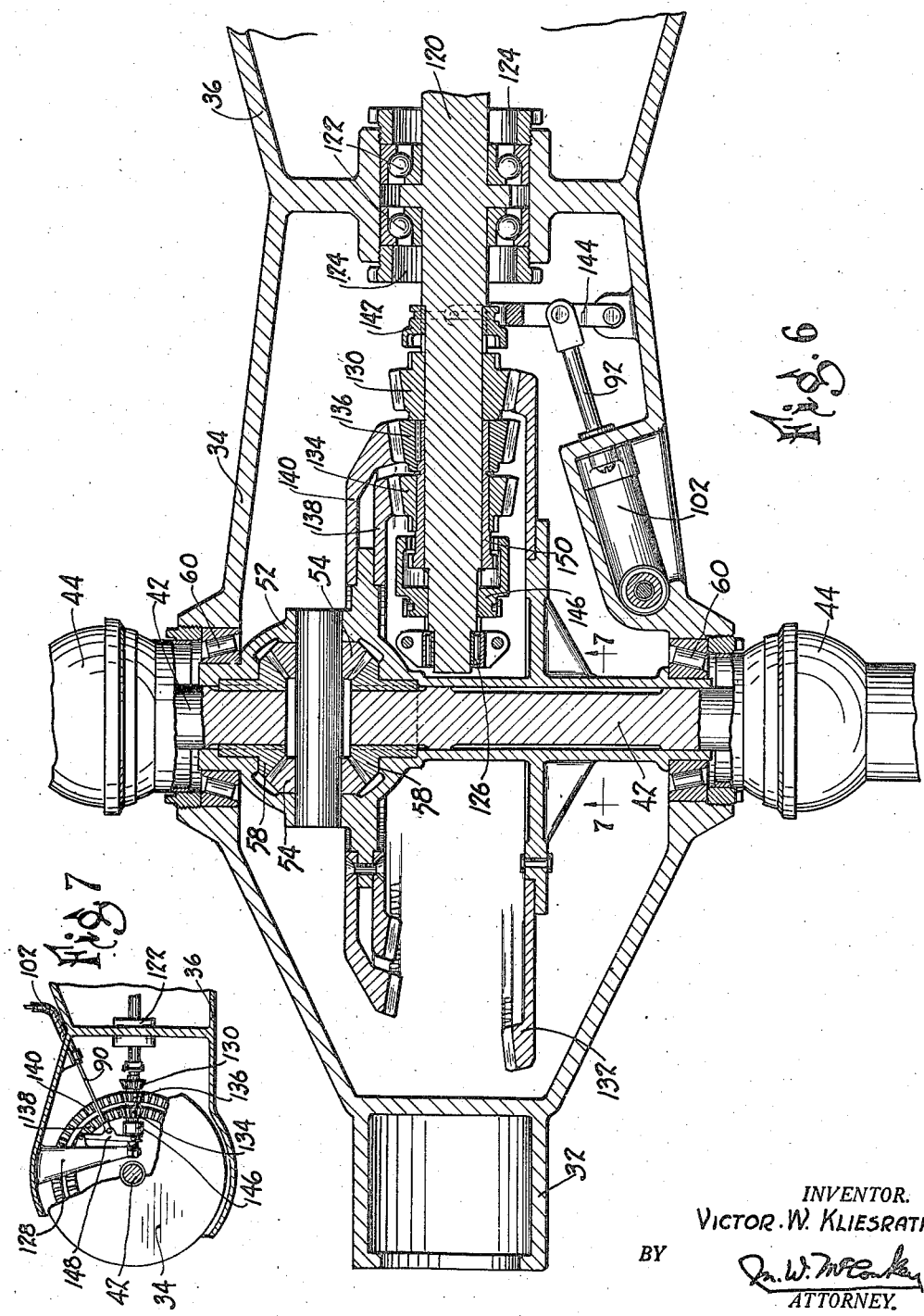

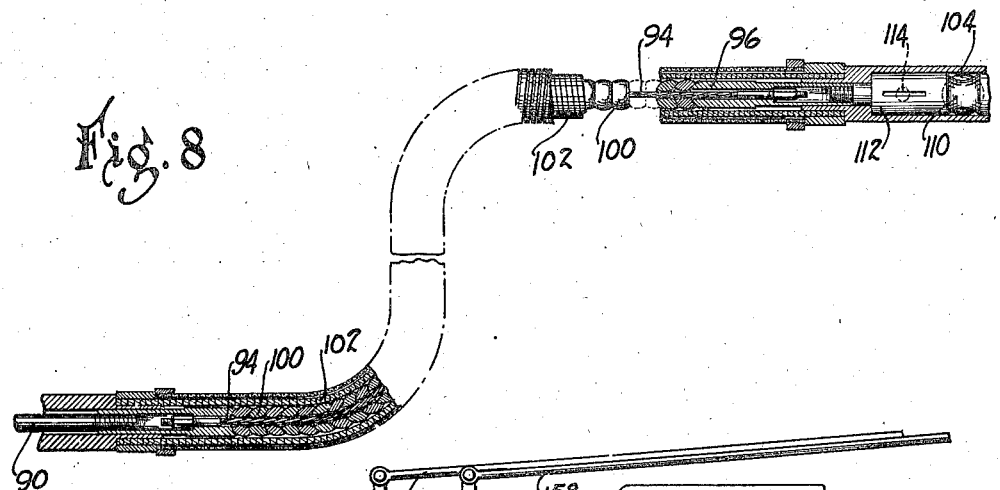
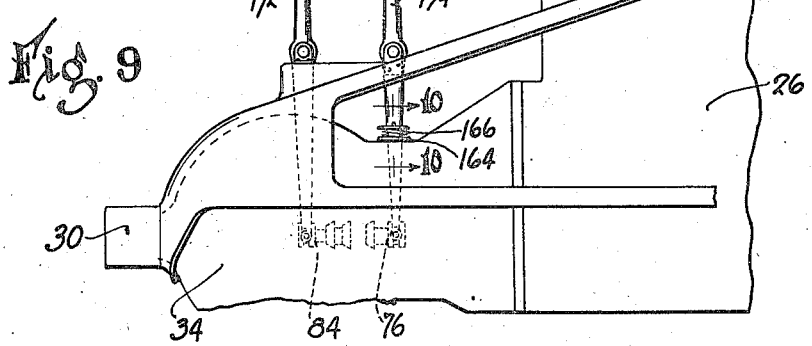
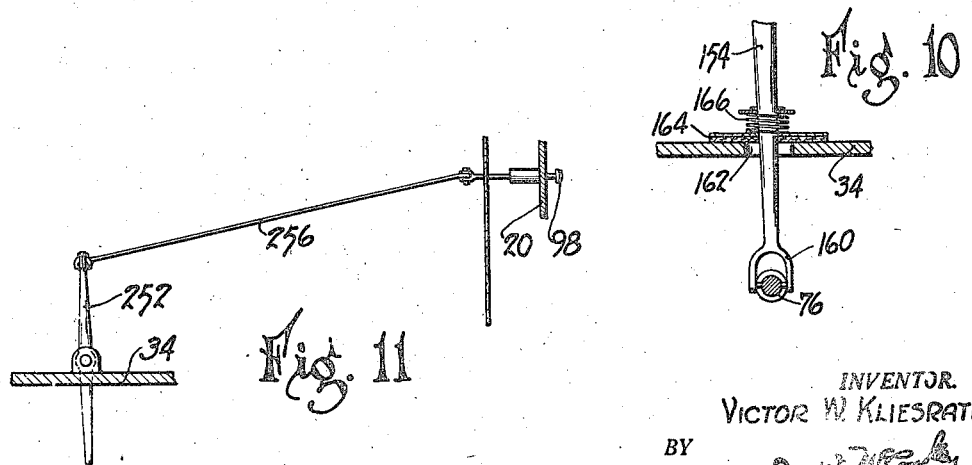
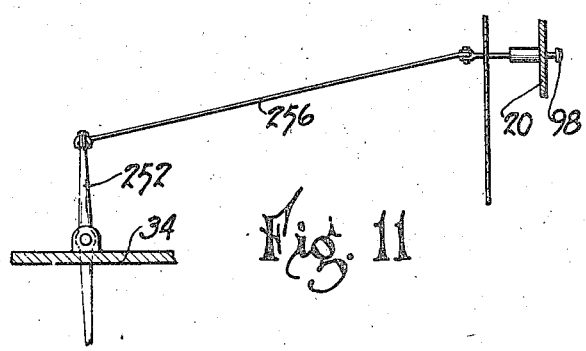

Patented Mar. 1, 1938

2,110,021

UNITED STATES PATENT OFFICE 2,110,021

DRIVING MECHANISM

Victor W. Kliesrath, Port Washington, Long Island, N. Y., assignor to The Steel Wheel Corporation, Chicago, Ill., a corporation of New York Application January 21, 1933, Serial No. 652,953

14 Claims. (Cl. 180—54)

This invention relates to driving mechanism for vehicles or the like, and is illustrated as embodied in a novel front-wheel drive automobile. An object of the invention is to provide compact and simple but effective driving mechanism, especially adapted for a vehicle of this type, preferably so arranged that it adds very little to the length of the engine or power unit.

In one desirable arrangement this result is secured by combining the change-speed gearing of the driving mechanism with the differential, which drives the two front wheels, and preferably also combining in the same unit a reverse gearing or drive. This gives a drive mechanism unit which adds very little to the length of the engine proper, thereby overcoming one serious disadvantage of previous front-wheel-drive designs.

According to an important feature of the invention, advantage is taken of the described combination of the change-speed gearing with the differential to secure what is (in effect) at all speeds, or at least at all the usual speeds, a "direct drive", by which is ordinarily meant a drive in which the only gear reduction between the engine and the wheels is that provided by the gear reduction of the differential itself. This reduction in the differential cannot be eliminated in any of the ordinary designs of motor vehicle, and can readily be made very quiet and therefore unobjectionable, and the virtual elimination at all speeds of all other gear reductions is a highly advantageous result of my invention.

The novel gearing, in its preferred form selectively couples to the differential at different speeds an engine-driven shaft, preferably driven through a suitable clutch by the engine crankshaft and mounted for rotation about the axis of rotation of the crankshaft. The differential is shown as having a plurality of driven gears of different diameters, and which may conveniently be bevel ring gears secured to the differential, selectively driven by one or the other of corresponding drive pinions on the engine-driven shaft.

The parts are arranged with the axis of the differential (and of its wheel-driving axle shafts) spaced vertically from, and preferably below the axis of the above-described engine-driven shaft, so that the latter may extend entirely across the differential and if desired have supporting bearings at both sides thereof. The pinions may have bevel teeth of spiral form, sometimes called "skew gears", to make this arrangement possible. This permits one of the pinions to engage its driven differential bevel ring gear on the opposite side of the differential from the others, thereby providing in a very simple manner a reverse gear. Novel interlocking means may be provided to insure that no more than one of the pinions will be in operative driving connection with the differential at any one time.

In using the described novel driving mechanism for driving the front wheels of a motor vehicle, I prefer to take advantage of the arrangement to pivot the entire engine or power unit for movement about the above-mentioned axis of the engine-driven shaft and of the engine crankshaft, with yielding means provided to restrain its pivotal movement and absorb the reaction torque of the engine without transmitting it to the vehicle body. The yielding means for this purpose may advantageously be resilient, or yieldingly-mounted, axle substitutes connected directly to the power unit and rotatably carrying the road wheels, whereby the reaction torque of the engine is yieldingly transmitted directly to the road wheels.

Another feature of the invention relates to the operation of change-speed gearing, preferably combined with a differential as described above, and which forms a part of such a pivotally mounted power unit, by means which is mounted separately from the unit which shifts the gearing substantially unaffected by pivotal movement of the unit of which the gearing forms a part. Thus the part of the control means which is actuated by the driver is utterly unaffected by engine reactions or vibrations and in fact, since the reactions or vibrations are transmitted directly to the road wheels, they may exist in considerable amplitude with the driver entirely unaware of them even if they occur while he is shifting gears.

In one arrangement this is accomplished by shifting the pinions, or clutch members selectively connecting the pinions to the engine-driven shaft, or the like, by means of operating devices such as levers which are fulcrumed or otherwise mounted on the support which pivotally carries the power unit, instead of being mounted in the usual manner directly on the unit. Since the pinions and their clutch members are co-axial with respect to the engine pivot mounting, as explained above, these levers or equivalent devices shift them back and forth, as required, entirely unaffected by pivotal movement of the power unit.

In another desirable arrangement, the shifting members are mounted inside the pivoted power unit, being for example (as shown) vertical levers pivoted at their lower ends to the differential-transmission housing, and are operated by means, such as flexible Bowden controls of a novel push-and-pull type, which themselves are unaffected by movement of the levers as the power unit swings about its pivot mounting and which therefore compensate for such movement.

The above and other objects and features of the invention, including various novel constructions and desirable particular arrangements, will be apparent from the following description of the illustrative embodiments shown in the accompanying drawings, in which:

Figure 5 is a partial section on the line 5—5 of Figure 1 and showing the driver-operated part of the gear shifting mechanism;

Figure 6 is a horizontal section corresponding to Figure 2 but showing a modified arrangement of the gearing;

Figure 7 is a view partly in side elevation and partly in section on the line 7—7 of Figure 6, and showing the arrangement of the gear shifting means of that figure;

Figure 8 is a section illustrating the construction of the novel Bowden operating means of Figure 1;

Figure 9 is a view corresponding to part of Figure 1 and showing a modification of the operating mechanism, in which rigid rods and levers are substituted in a novel manner for the improved Bowden operating means of Figure 1;

Figure 10 is a partial section on the line 10—10 of Figure 9 and showing one manner of sealing the opening through which the operating lever extends into the gear housing; and Figure 11 is a partial section corresponding to Figures 1 and 9 and showing a modified form of operating means.

Figure 1:
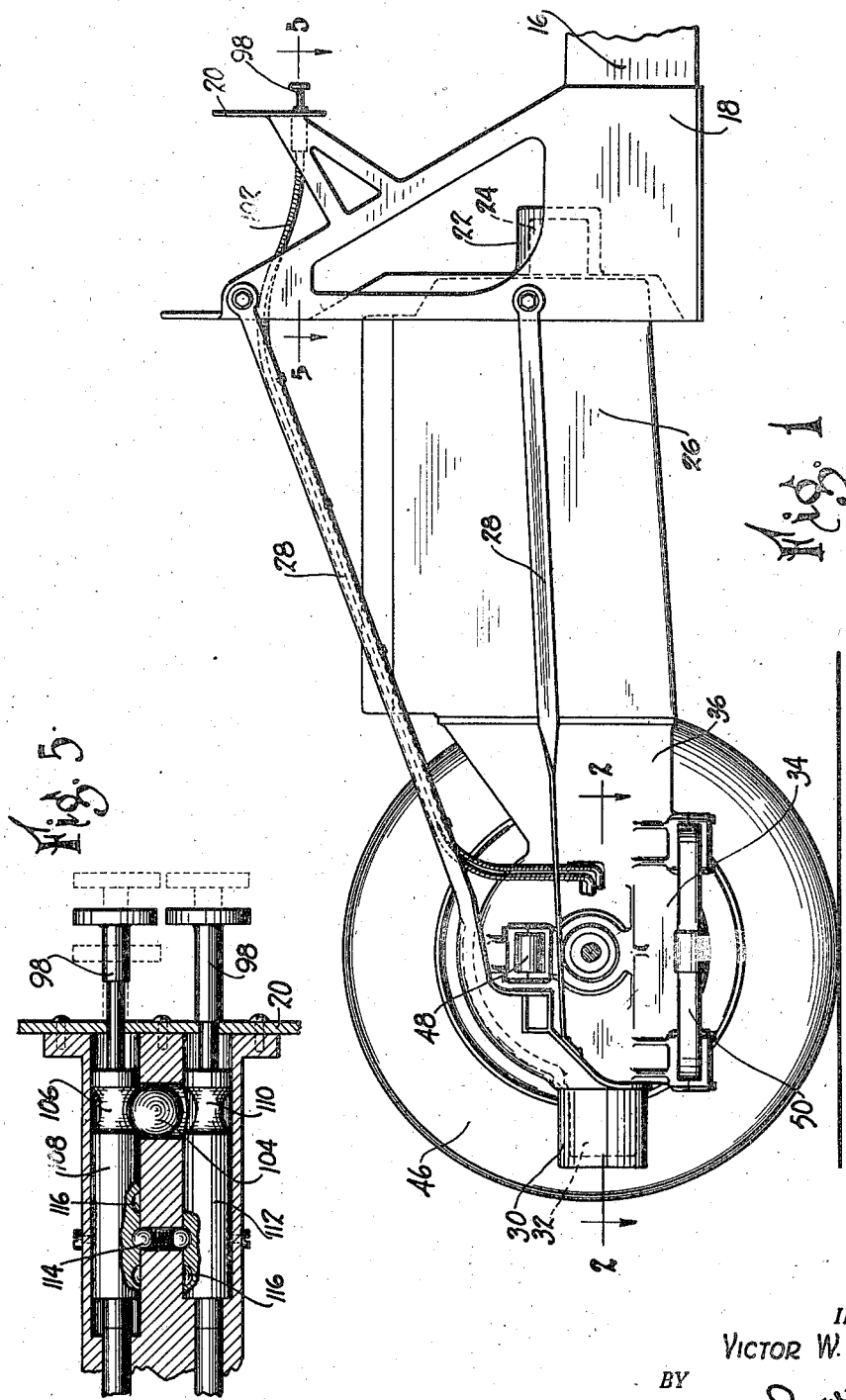
Figure 1 is a partial longitudinal section through the front end of a motor vehicle embodying my invention, in a plane just inside the near wheel.

In the attached drawings my invention is shown as embodied in an automobile or other vehicle, of the type which is more fully described, and which is claimed, in my co-pending application No. 651,821 filed January 14, 1933. In this particular type of motor vehicle the car is driven by an engine, preferably arranged in a power unit with a clutch and a change-speed transmission and a differential, and which drives the front wheels of the vehicle. The power unit, as more fully explained below and in my said co-pending application, is preferably pivotally mounted so that it does not transmit its torque reaction to the vehicle body, and I prefer to mount directly on the pivoted power unit yieldingly held axle sections or the like which form in effect individually-sprung mountings for the front road wheels.

It is not my intention to claim in the present application any of the subject matter described and claimed in my said co-pending application, except as it enters into the combination of the present invention. It is moreover to be understood that the illustration in the drawings and the following description are intended to explain the embodiment of the invention in a vehicle of this type for purposes of illustration only, some features of the invention being equally applicable to vehicles of other types.

In the illustrated arrangement, the box-section base of the vehicle body (which forms in effect a substitute for the usual chassis frame) is illustrated at 16, and has bolted or otherwise secured thereto a transversely-extending dash member 18 which is shown as having formed integrally therewith an instrument board 20, and which has approximately at its center a bearing 22 pivotally receiving a cylindrical boss 24 formed on the rear face of the cylinder block of an engine 26 which forms part of the above-described power unit. The dash 18 has bolted or otherwise secured thereto a forwardly-extending frame or support 28 of generally pyramidal form, which is arranged to have its parts on opposite sides of and above the engine 26, and which carries at its front end a bearing 30 pivotally receiving another boss 32 coaxial with respect to the boss 24. The boss 32 is formed on the forward end of a housing 34 which encloses a novel transmission and differential mechanism, and which may be integral with a housing 36 for a clutch 38. The housing 34—36 may be bolted or otherwise rigidly secured to the engine 26 to form a power unit, or what is usually called a "unit power plant".

The clutch 38 is arranged to connect the engine to, and to disconnect the engine from, an engine driven shaft 40 which is arranged to drive, through the novel transmission and differential described below, live axle shafts 42 extending through jointed housings 44 and driving the road wheels 46 in the same general manner as more fully explained in my above-identified co-pending application. The road wheels are each rotatably carried by a suitable support (not shown herein) mounted at the outer ends of an upper axle section 48 and a lower Y-shaped axle section 50, yieldably mounted on opposite sides of the housing 34 in the same manner as fully described in my said co-pending application.

According to an important feature of the present invention, the engine driven shaft 40 is arranged to drive at different speeds, and in either forward or reverse direction, the axle shafts 42, which are arranged at right angles thereto, through novel gear connections or the like driving one or the other of a plurality of driven bevel differential gears or the like described below. These driven gears are bolted or otherwise rigidly connected to the housing 52 of a differential containing a plurality of differential pinions 54 carried by a transverse shaft 56 and meshing with driven bevel pinions 58 keyed to the adjacent ends of the two shafts 42. The adjacent ends of the shafts 42 are rotatably supported by the opposite ends of the housing 52, these ends being journalled in roller or other bearings 60 which therefore serve to support both the differential and the axle shafts. The bearings 60 are carried by the opposite side walls of the housing 34 and are held by adjustable ring nuts 62 threaded into the housing.

Figure 2:
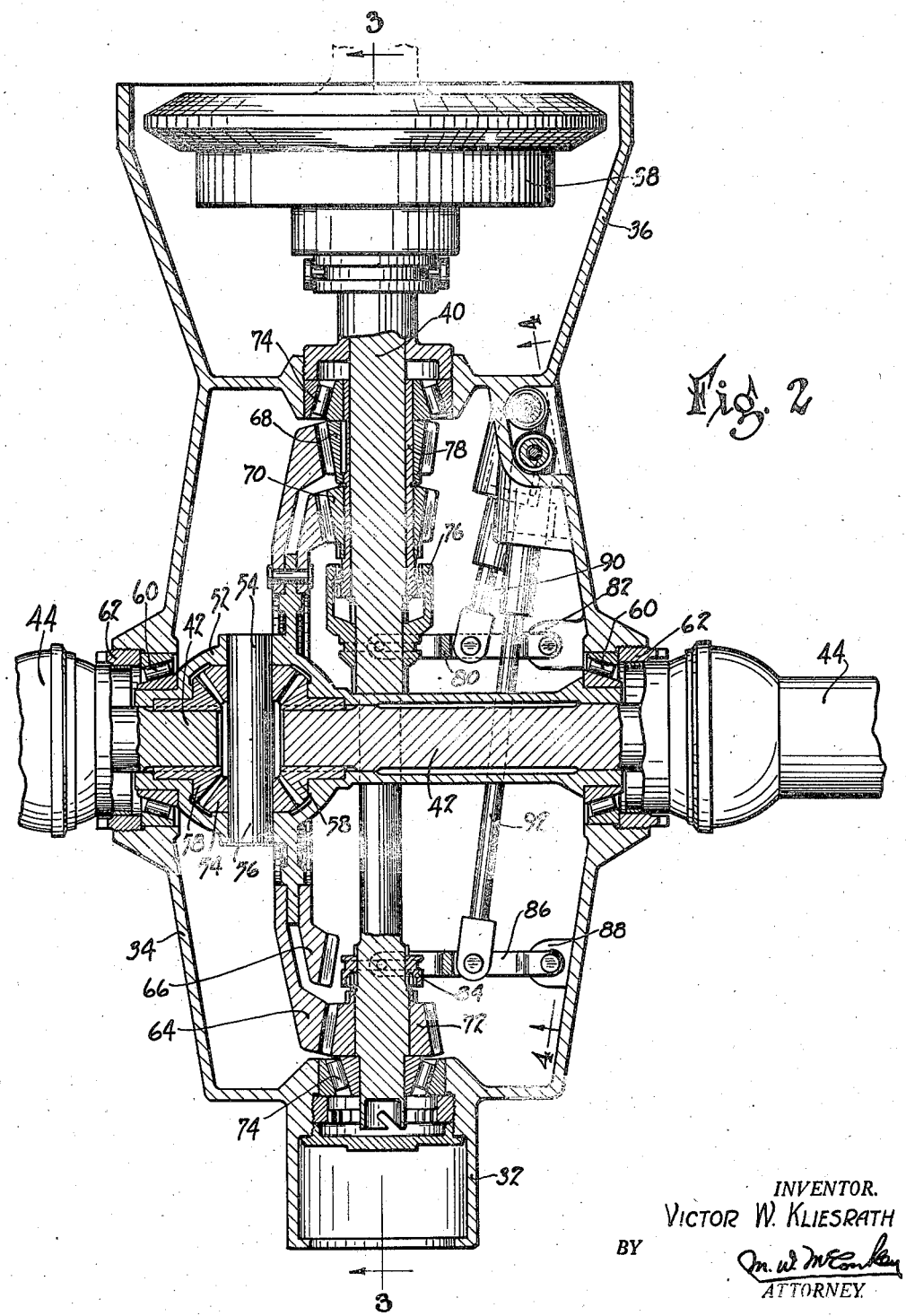
Figure 2 is a horizontal section, on the line 2—2 of Figure 1, through one embodiment of the novel transmission and differential mechanism.
Figure 3:
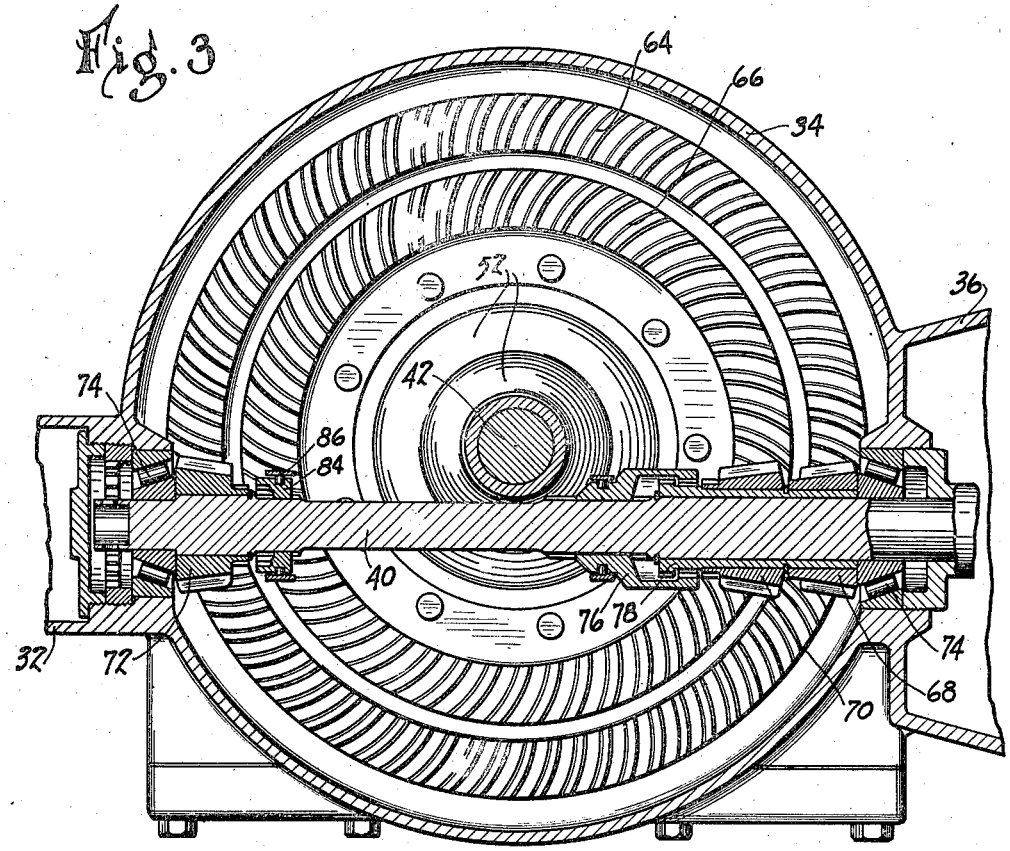
Figure 3 is a vertical section through this mechanism, on the line 3—3 of Figure 2.
Figure 4:
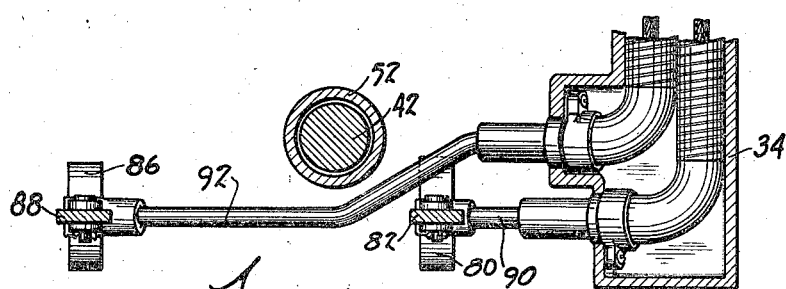
Figure 4 is a partial section, on the line 4—4 of Figure 2 showing the mounting and arrangement of the gear-shifting means.

In the particular embodiment shown in Figures 2 and 3, the differential has a large-diameter driven ring gear 64, shown as having skew-bevel teeth, and a smaller-diameter similar driven ring gear 66. According to one feature of the present invention, the high and low speeds of the automobile are secured by direct driving of one or the other of these two gears, so that in effect the vehicle has at both speeds what is known as a "direct drive", i. e. a drive in which the only geared connection is in the differential. Preferably reverse drive is also a "direct drive" secured by engagement with one of these differential gears.

In the arrangement being described, the engine driven shaft 40 which is driven by the clutch 38 extends forward perpendicularly with respect to the axis of the differential and slightly below the plane of the axle shafts 42, and has sleeved thereon driving means shown as three bevel pinions 68, 70, and 72. The pinions 68 and 70 mesh with the driven gears 64 and 66 respectively, between the clutch and the differential, while the pinion 72 meshes with the driven gear 64 on the opposite side of the differential from the clutch, being at the extreme front end of the shaft 40. The shaft 40 is shown rotatably supported by roller or other bearings 74 carried by the housing 34.

Either of the pinions 68 or 70 can be clutched to the engine-driven shaft 40 by means such as a clutch sleeve 76. This sleeve is keyed on the shaft, and is movable axially thereof to bring clutch teeth at its rearward end into mesh selectively either with corresponding teeth formed on the base of the bevel pinion 70 or with similar teeth formed at the forward end of a sleeve 78. The sleeve 78 is mounted on the shaft 40 and has the pinion 68 keyed thereon. The clutch member 76 can be shifted axially of the shaft by manipulation of means such as a shifter-fork lever 80 pivoted on a boss 82 formed on the housing 34.

Similarly, the pinion 72 can be clutched in driving engagement with the shaft 40 by axial movement of a clutch member 84 which is keyed on the shaft, and which is formed with clutch teeth adapted for inter-engagement with corresponding teeth formed on the base of the pinion 72. The clutch member 84 is operated by means shown as a shifter-fork lever 86 pivoted on a boss 88 formed on the casing 34.

The levers 86 and 80, or their equivalents, are selectively operable to give high or low or reverse drive, by shifter rods 90 and 92 or the like pivoted thereto. Each of these rods is operable by the driver through suitable connections, one form of which is shown in detail in Figure 8.

This particular form of operating mechanism is of the "Bowden" type and includes a flexible tension cable 94 connected to the rod 90 or 92 at one end and to an operating plunger 96 mounted in the dash 20 and having a pull handle 98 at its other end. On this cable are threaded interfitting compression elements 100 having a ball and socket engagement with each other, there being shoulders at each end of the cable between which the compression elements are confined. The composite tension and compression element thus produced is slidably arranged in a Bowden type flexible conduit 102, which is secured to a boss on the housing 34 at its forward end and secured to the instrument board or dash member 20 at its rearward end. It will be seen that this permits of either push or pull operation of either of the levers 86 or 89 by the driver entirely unaffected by pivotal movement of the power unit in which the levers 86 and 80 are arranged.

As best shown in Figure 5, the operating means for the two levers is preferably provided with interlocking means which prevents the operation of either of the levers 80 or 86 unless the other one is in neutral position. The particular means illustrated includes an interlocking ball 104, movable either into an annular recess 106 in the plunger 108 whose movement controls the operation of the lever 80 or into a corresponding recess 110 in a plunger 112 whose movement controls the operation of the lever 86. Yielding means, such as spring-pressed balls 114 adapted to fit in semi-spherical sockets 116 formed in the plungers 108 and 112, may be provided to hold the plungers resiliently in their several positions.

It will be seen that the plunger 112 has two positions: its full-line position in which it is in neutral and its dotted-line position in which the pinion 72 is clutched to the shaft 40. The plunger 108 has three positions, including one extreme dotted-line position in which the pinion 70 is clutched to the shaft 40, and another extreme dotted-line position in which the pinion 68 is clutched to that shaft, together with an intermediate full-line neutral position. It will also be seen that the plunger 108 cannot be moved from its neutral position unless the plunger 112 is in neutral, and that the plunger 112 cannot be moved unless the plunger 108 is in neutral. It will also be seen that the shifting of the gears into high, low, or reverse is entirely unaffected by pivotal movement of the power unit.

In the arrangement of Figures 6 and 7, the engine driven shaft 120, corresponding to the shaft 40, is in the same plane as the axle shafts 42 instead of below that plane. It is supported by means such as a pair of ball bearings 122 mounted in the partition between the casings 34 and 36 and held by means such as threaded nuts 124, and by means such as a roller bearing 126 carried by a vertical downwardly-extending post 128 (Figure 7) secured in any desired manner to the casing 34. The shaft 120 has mounted thereon a reverse drive pinion 130 meshing with a driven bevel gear 132 mounted on the differential casing 52 on one side of the engine driven shaft 120, and also has two (high and low) drive pinions 134 and 136 meshing respectively with driven bevel differential gears 138 and 140 carried by the differential casing 52 on the other side of the engine driven shaft 120.

The reverse drive pinion 130 may be clutched to or unclutched from the shaft 120 by axial movement of a clutch member 142 keyed to the shaft, and which is operated by means such as a shifter-fork lever 144 shown as pivoted on the housing 34 for movement in a horizontal plane. The forward drive pinions 134 and 136 may be selectively clutched to or unclutched from the engine driven shaft 120, by axial movement of a clutch member 146 keyed to the shaft. Member 146 is operated by means such as a vertically-extending shifter-fork lever 148 shown as pivoted on the post 128. The levers 148 and 144 may be operated by the above-described mechanism shown in Figures 5 and 8 or by the alternative mechanism described below. The clutch member 142 is formed with teeth adapted to mesh with corresponding teeth formed on the base of the pinion 130. The clutch member 146 is formed with teeth adapted to mesh selectively with similar teeth formed on the base of the pinion 134 or with clutch teeth formed on the end of a sleeve 150 keyed to the pinion 136.

It will be seen that since the drive from the pinion 130 is on one side of the shaft 120 and the drive from the pinions 134 and 136 is on the opposite side of that shaft, these drives will be in opposite directions. Therefore, when the pinion 130 is driving the vehicle is moved backwards, while when either of the pinions 134 or 136 is driving the vehicle moves forward either at high or low speed. In all three cases, the drive is what is known in the automotive art as a "direct drive", that is the only geared connection between the engine and the road wheels is the bevel pinion drive in the differential.

In the arrangement shown in Figures 9 and 10, instead of the Bowden control mechanism described above and illustrated in detail in Figures 5 and 8, the clutch members 84 and 76 (or 142 and 146) are operated by vertically-extending levers 152 and 154 which are not carried by the pivoted power unit itself but which instead are pivoted on the support or frame 28 in which the power unit is mounted. The levers 152 and 154 therefore do not have any pivotal movement with the power unit and it is feasible to connect them directly with plungers 112 and 108, respectively, by rigid operating rods 156 and 158.

The lower end of each lever is illustrated in Figure 10 as formed with a shifter-fork 160 operatively engaging the corresponding one of the clutch members 76, 84, 142, or 146, as the case may be. Each of the levers 152 and 154 extends through an opening 162 in the housing 34, which opening is large enough to permit the pivotal vibrations of the power unit and which is preferably closed by a sliding cover 164 mounted on the lever and yieldingly held against the face of the casing 34 by means such as a spring 166. In the particular arrangement illustrated, the levers 152 and 154 are long enough so that the operating rods 156 and 158 pass over the top of the engine 26 for operation by mechanism such as that shown in Figure 5.

In Figure 11 is shown an arrangement in which instead of the levers 152 and 154 pivoted on the frame 28, the change-speed elements are shifted by somewhat similar vertical levers 252, etc., extending vertically through the casing 34 and pivoted directly on the casing, and connected at their upper ends by relatively long operating rods 256 to the mechanism shown in Figure 5. In this case the members 252 and 256 are long enough so that the oscillations of the power unit, in a plane which is almost perpendicular to the operating rod 256, cause such an extremely small component lengthwise of the vehicle in their action on the rod 256 that they do not have any substantial effect on the operation of the gear shifting mechanism. That is, while the means shown in Figure 11 is not quite as accurate theoretically as the means shown in Figures 1 and 9 in eliminating the effect on the operating mechanism of the movements of the power unit, it is minimized to such an extent that there is no possibility of its interfering with the shifting of the gears or with the positions of the plungers 108 and 112.

While various illustrative constructions have been described in detail, it is not my intention to limit the scope of my invention to those particular constructions, or otherwise than by the terms of the appended claims.

I claim:

1. A vehicle having a support, a power unit including change-speed mechanism and which is mounted on pivots for pivotal movement with respect to said support and which has independently-movable axle means extending laterally in opposite directions therefrom and carrying road wheels driven by said power unit, and control means for the change-speed mechanism mounted on the support and operating said mechanism unaffected by pivotal movement of the power unit.

2. A vehicle having a support, a power unit including change-speed mechanism and which is pivotally mounted at its front and rear ends on pivots upon said support and which has axle means extending laterally therefrom and carrying road wheels and control means for the change-speed mechanism mounted on the support and operating said mechanism unaffected by pivotal movement of the power unit.

3. A device of the class described comprising a support, a power unit mounted for movement with respect to said support and including change-speed mechanism having an element movable to effect speed changes and which is arranged at a neutral point relatively to the movement of said unit, and an operating member mounted on the support and operatively engaging said element substantially at said neutral point and actuating it substantially unaffected by movement of said unit.

4. A device of the class described comprising a support, change-speed mechanism mounted for pivotal movement with respect to the support and having two elements movable to effect speed changes, a pivoted lever operatively engaging each of said elements and arranged to actuate them independently of said pivotal movement, and two operating devices for the levers having interlocking means preventing operation of either lever unless the other is in neutral position.

5. A device of the class described comprising a support, change-speed mechanism mounted for pivotal movement with respect to the support and having two elements movable to effect speed changes, a pivoted lever operatively engaging each of said elements and arranged to actuate them independently of said pivotal movement, and operating means for the levers having interlocking means preventing operation of either lever unless the other is in neutral position.

6. A vehicle comprising a power unit mounted on pivots and having secured thereto axle means taking the reaction torque of the unit and rotatably carrying road wheels, driving axle shafts connected to said wheels and having between and drivably connecting them a differential forming a part of said unit and which has two ring gears of different sizes, and an engine-driven shaft also forming a part of the power unit and having driving means arranged selectively to drive said differential through one or the other of the ring gears in one direction to give two forward speeds, or through at least one of the ring gears in the other direction to give a reverse drive.

7. A vehicle comprising a power unit mounted on pivots and having secured thereto axle means taking the reaction torque of the unit and rotatably carrying road wheels, driving axle shafts connected to said wheels and having between and drivably connecting them a differential forming a part of said unit and which has two ring gears of different sizes, and an engine-driven shaft also forming a part of the power unit and having driving means arranged selectively to drive said differential through one or the other of the ring gears.

8. A power unit comprising, in one rigidly-connected assembly, an engine having a crankshaft provided with a flywheel, a clutch cooperating with the flywheel, a driven shaft coaxial with the axis of rotation of the crankshaft, a differential adjacent the driven shaft, and means on the driven shaft for selectively drivably connecting the driven shaft directly to the differential at different gear ratios, in combination with a support for said assembly on which it is pivoted about the axis of rotation of said crankshaft and said driven shaft, and means for yieldingly restraining the pivotal movement of said assembly.

9. A vehicle comprising a pivotally mounted power unit yieldingly connected to a pair of road wheels and including a differential driving said wheels and axially connected thereto and which has two bevel gears arranged to be driven about an axis paralleling the wheel axis, said unit also including an engine and an engine-driven shaft extending longitudinally of the vehicle and perpendicular to the bevel gear axis and which shaft extends entirely across the faces of said differential bevel gears above the axis of said gears, bevel drive pinions on said shaft engaging said bevel gears, and means for selectively causing one or the other of said pinions to be driven by the shaft and to drive said differential.

10. A vehicle comprising a pivotally mounted power unit yieldingly connected to a pair of road wheels and including a differential driving said wheels and which has two bevel gears arranged to be driven about an axis paralleling the wheel axis, said unit also including an engine and an engine-driven shaft extending longitudinally of the vehicle and perpendicular to the bevel gear axis and which shaft extends entirely across the faces of said differential bevel gears, bevel drive pinions on said shaft engaging said bevel gears, and means for selectively causing one or the other of said pinions to be driven by the shaft and to drive said differential, said shaft being arranged to cross the gears a short distance above the axis of the gears, and the power unit being arranged for pivotal movement about the axis of the shaft.

11. In a vehicle, a differential comprising driven shafts, a driving shaft extending across the axis of the driven shafts eccentrically thereto, a plurality of ring gears of different sizes having teeth curved at an angle to a radius of said gears, and driving pinions on the driving shaft on opposite sides of the driven shaft constantly in mesh with said ring gears.

12. In a vehicle, a differential comprising a plurality of ring gears of different sizes, an engine driven shaft having driving means for selectively driving said rings gears, control means for selecting the ring gear to be driven, a casing enclosing said differential, a flexible cable extending through an opening in said casing and connected to said control means, and a flexible conduit receiving the cable and secured to the casing to close said opening thereby to prevent entry of foreign matter into the casing or exit of lubricant therefrom.

13. A power unit comprising, in one rigidly connected assembly, an engine having a crankshaft provided with a flywheel, a driven shaft coaxial with the axis of rotation of the crankshaft, a differential adjacent the driven shaft, and means on the driven shaft for selectively drivably connecting the driven shaft directly to the differential at different gear ratios, in combination with a support for said assembly on which it is pivoted, road wheels, and means yieldingly connecting said assembly to the road wheels for yieldingly restraining the pivotal movement of said assembly.

14. A vehicle comprising a pair of driven road wheels and a power unit having a differential between and drivably axially connected to said wheels and forming a part of said unit and which has two coaxial ring gears of different sizes, and an engine-driven shaft mounted eccentrically to the axis of said ring gears also forming a part of the power unit and having driving means arranged selectively to drive said differential through one or the other of the ring gears on one side of the ring gear axis in one direction, to give two forward speeds, or through at least one of the ring gears on the other side of the ring gear axis in the other direction to give a reverse drive.

VICTOR W. KLIESRATH.